United States Patent

Sugawara

[11] Patent Number: 5,552,938
[45] Date of Patent: Sep. 3, 1996

[54] PROJECTION DEVICE FOR PROJECTING AN ORIGINAL IMAGE ONTO A SCREEN

[75] Inventor: Saburo Sugawara, Kawasaki, Japan

[73] Assignee: Canon Kabushiki Kaisha, Tokyo, Japan

[21] Appl. No.: 412,104

[22] Filed: Mar. 28, 1995

Related U.S. Application Data

[63] Continuation of Ser. No. 873,236, Apr. 24, 1992, abandoned.

[30] Foreign Application Priority Data

Apr. 26, 1991 [JP] Japan ................................. 3-097259

[51] Int. Cl.$^6$ ............................. G02B 9/06; G02B 15/14; G02B 17/00; H04N 9/31
[52] U.S. Cl. ..................... 359/691; 359/634; 359/726; 359/736; 359/794; 348/744
[58] Field of Search ................. 359/40, 41, 48, 359/49, 72, 634, 629, 636, 638, 726, 745, 748, 749, 753, 794, 798, 800, 691, 793, 40, 732, 733, 736, 749, 750, 751, 752, 753, 784, 785, 793, 794, 649, 650, 651; 358/60, 61, 231; 348/744, 751; H04N 9/31

[56] References Cited

U.S. PATENT DOCUMENTS 2,958,258 11/1960 Kelly ........................................ 359/638
4,806,003 2/1989 Mukai et al. ............................ 359/751
4,936,658 6/1990 Tanaka et al. ............................ 359/40
5,028,121 7/1991 Baur et al. ............................... 359/40
5,054,897 10/1991 Ozawa ................................ 359/691 X
5,108,172 4/1992 Flasck ................................. 359/68 X

FOREIGN PATENT DOCUMENTS 61-13885 1/1986 Japan .
0240936 10/1987 Japan ..................................... 359/41

Primary Examiner—Hung X. Dang
Attorney, Agent, or Firm—Fitzpatrick, Cella, Harper & Scinto

[57] ABSTRACT

Disclosed is a projection optical system for projecting an original image onto a screen, including a projection lens comprising, in succession from the screen side, a first lens unit having positive refractive power, and a second lens unit having positive refractive power, and a reflecting member disposed between the first lens unit and the second lens unit of the projection lens for directing light from an illuminating light source to the original image through the second lens unit, one of a plurality of sub-lens units constituting the first lens unit being moved to thereby effect focusing.

9 Claims, 20 Drawing Sheets

PROJECTION DEVICE FOR PROJECTING AN ORIGINAL IMAGE ONTO A SCREEN

This application is a continuation of application Ser. No. 07/873,236, filed Apr. 24, 1992, now abandoned.

BACKGROUND OF THE INVENTION

1. Field of the Invention

This invention relates to a projection optical system for enlarging and projecting the original image of a liquid crystal panel or the like.

2. Related Background Art

As a projection optical system for enlarging and projecting an original image formed by a liquid crystal panel or the like, there is one disclosed, for example, in Japanese Laid-Open Patent Application No. 61-13885. The projection optical system of this publication, as shown in FIG. 23 of the accompanying drawings, is provided with a light source, a wide band polarizing beam splitter, reflection type liquid crystal devices and a projection lens, and is designed such that reflected light from the light source is projected onto a screen through the polarizing beam splitter and the projection lens and an enlarged image is displayed on the screen.

In the above-described example of the prior art, however, as shown in FIG. 23, it has been necessary to dispose a polarizing beam splitter 12 and two color resolving dichroic prisms 13 and 14 between a projection lens 22 and reflection type liquid crystal devices 16, 17, 18 and therefore, a back focal length greater than three times the width of the reflection type liquid crystal devices 16, 17, 18 has been required of the projection lens 22. Therefore, this example of the prior art is of a construction which generally cannot be made greatly compact, and it has been necessary to use a lens of the so-called retrofocus type as the projection lens, and this has caused the lens to be bulky and increased the number of lenses used in the projection lens.

SUMMARY OF THE INVENTION

In view of such a problem peculiar to the prior art, the present invention intends to make a projection optical system compact, and further intends to suppress any fluctuation of the focus of the projection optical system when the optimal system is made compact.

A feature of the present invention resides in a projection optical system for projecting an original image onto a screen, the optical system including a projection lens comprising, in succession from the screen side, a first lens unit having positive refractive power, and a second lens unit having positive refractive power, and a reflecting-member disposed between said first lens unit and said second lens unit of said projection lens for directing light from an illuminating light source to said original image through said second lens unit, one of a plurality of lenses constituting said first lens unit being moved to thereby effect focusing.

DESCRIPTION OF THE PREFERRED EMBODIMENTS

Figure 1:
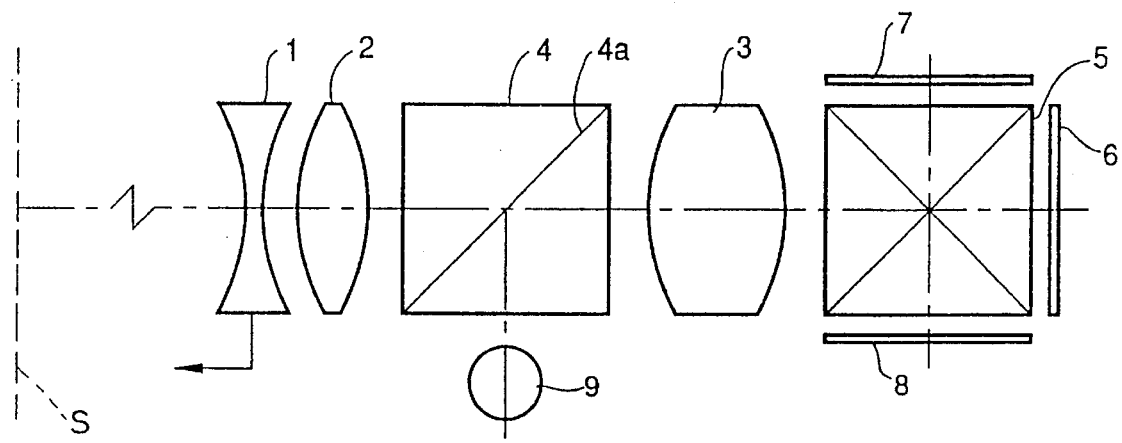
FIG. 1 is an optical cross-sectional view of a first embodiment of the present invention.
Figure 2:
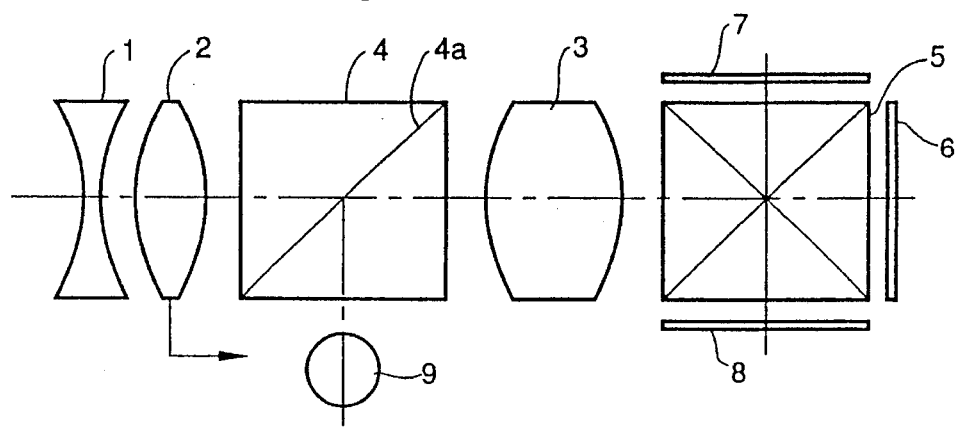
FIG. 2 is an optical cross-sectional view of a second embodiment of the present invention.

Referring to FIG. 1 which shows a cross-sectional view of the essential portions of a first embodiment of the present invention, the reference numeral 1 designates a negative lens constituting the front sub-lens unit of a first lens unit, the reference numeral 2 denotes a positive lens constituting the rear sub-lens unit of the first lens unit, and the reference numeral 3 designates a second lens unit having positive refractive power. The reference numeral 4 denotes a prism block having a reflecting surface 4a for reflecting, for example, S wave, the reference numeral 5 designates a conventional cross dichroic prism for effecting color resolution, the reference numeral 9 denotes a light source, and the reference numerals 6, 7 and 8 designate reflection type liquid crystal display devices which form original images.

Under such a construction, white illuminating light emitted from the light source 9 has its S wave alone reflected by the reflecting surface 4a and condensed by the second lens unit 3, and then is resolved into three colors by the cross dichroic prism 5, and these color lights arrive at the reflection type liquid crystal display devices 6, 7 and 8. These color lights are reflected by the original images on the reflection type liquid crystal display devices and are endowed with the gradations of the respective colors in accordance with display information formed, and are reflected again by the cross dichroic prism 5. The reflected lights are polarized into P wave by the liquid crystal display. The combined light is condensed by the second lens unit 3 and passes through the reflecting surface 4a, and is further condensed by the first lens unit 1, 2 and projected onto a distant screen S.

Figure 3:
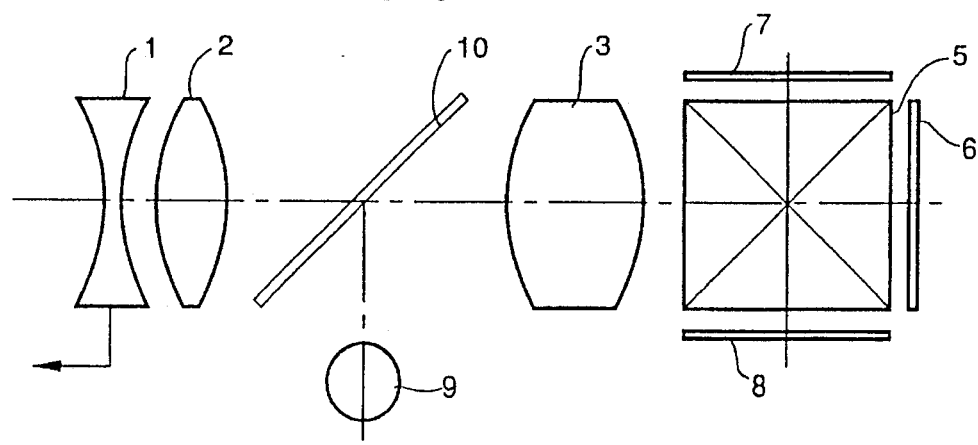
FIG. 3 is an optical cross-sectional view of a third embodiment of the present invention.
Figure 4:
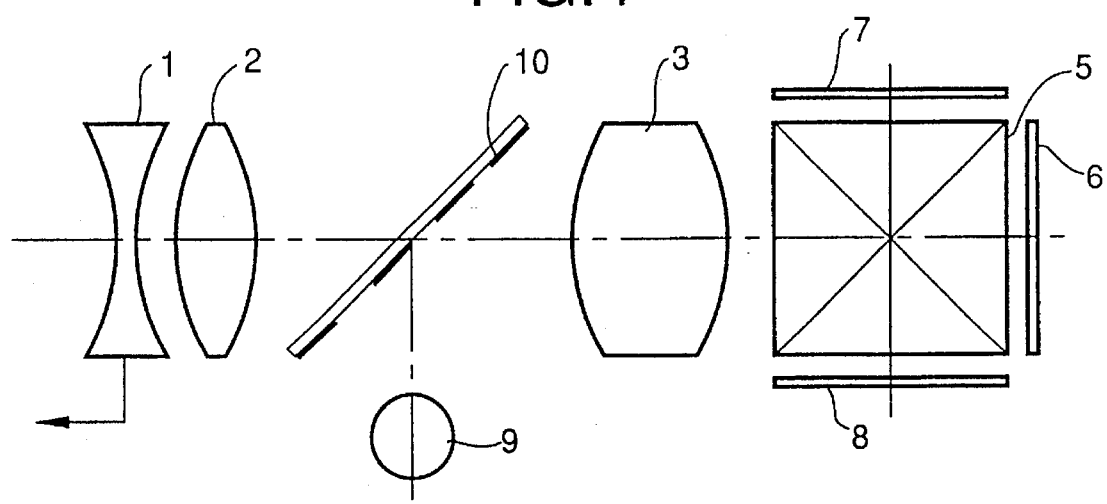
FIG. 4 is an optical cross-sectional view of a fourth embodiment of the present invention.
Figure 5:
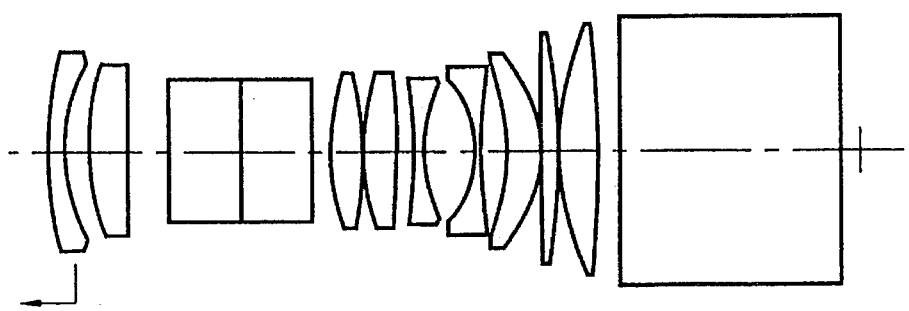
FIG. 5 is a cross-sectional view of the lens of a first numerical value embodiment of the present invention.
Figure 6:
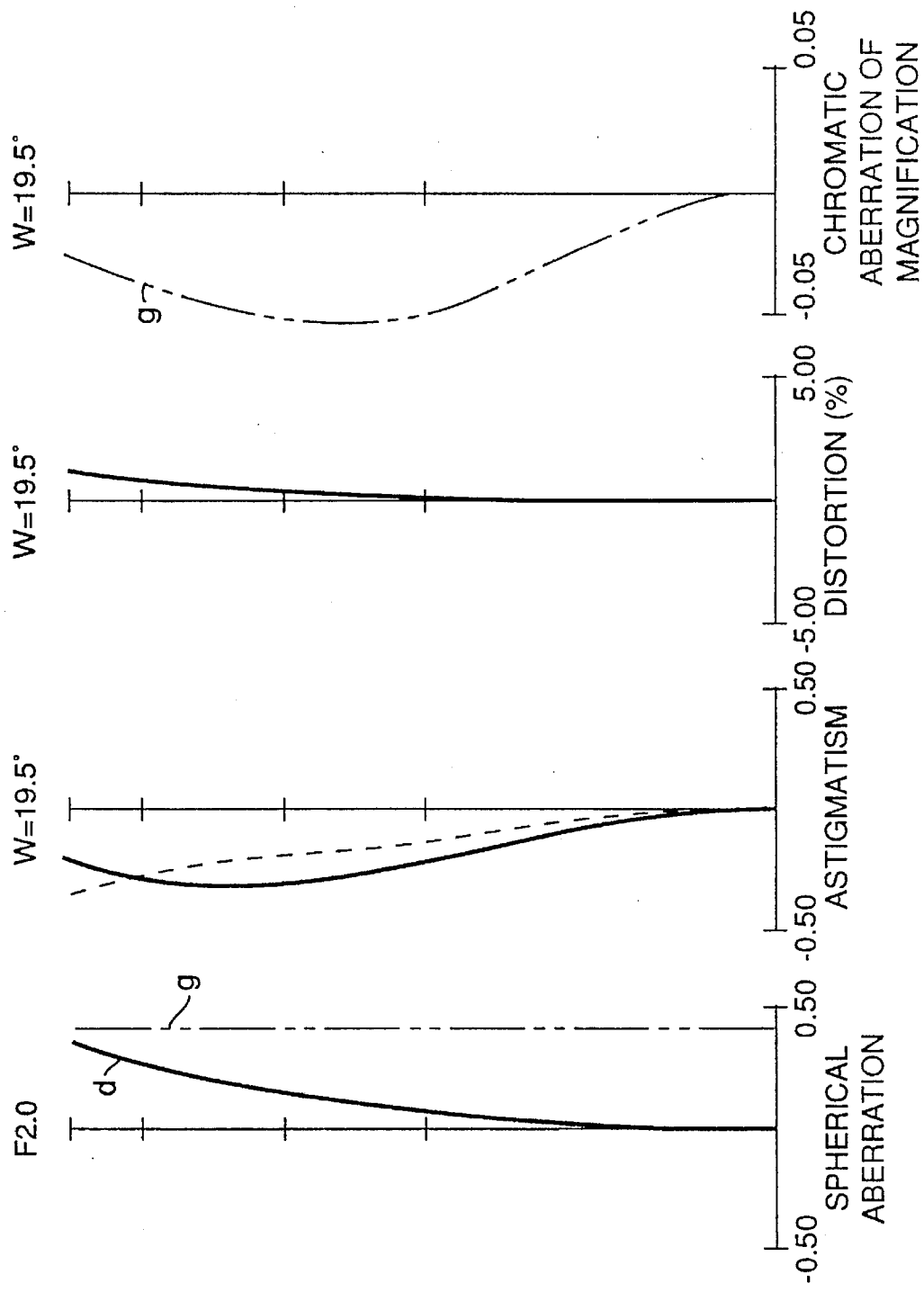
FIG. 6 shows aberrations in the first numerical value embodiment (magnification 40×).
Figure 7:
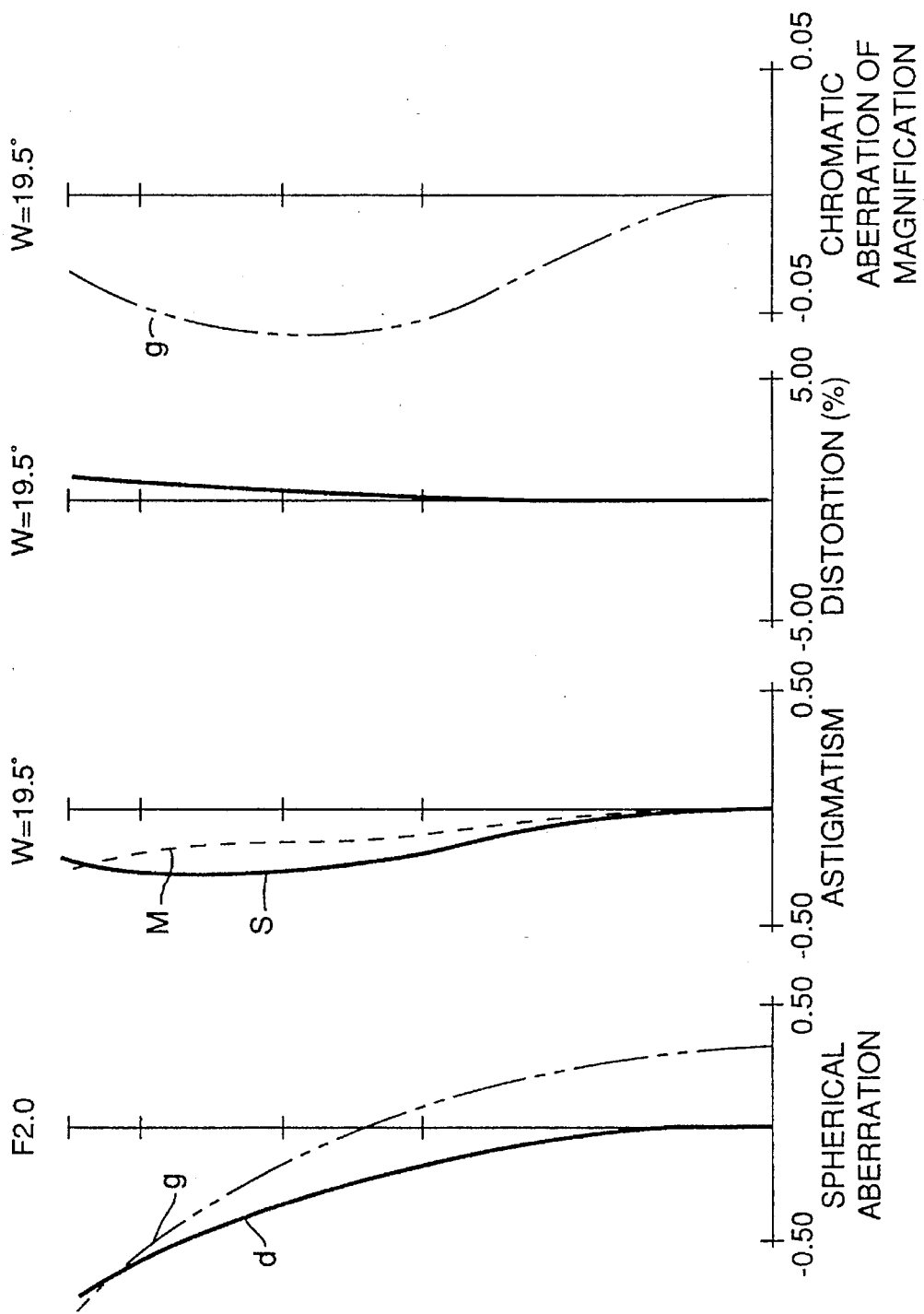
FIG. 7 shows aberrations in the first numerical value embodiment (magnification 2033).
Figure 8:
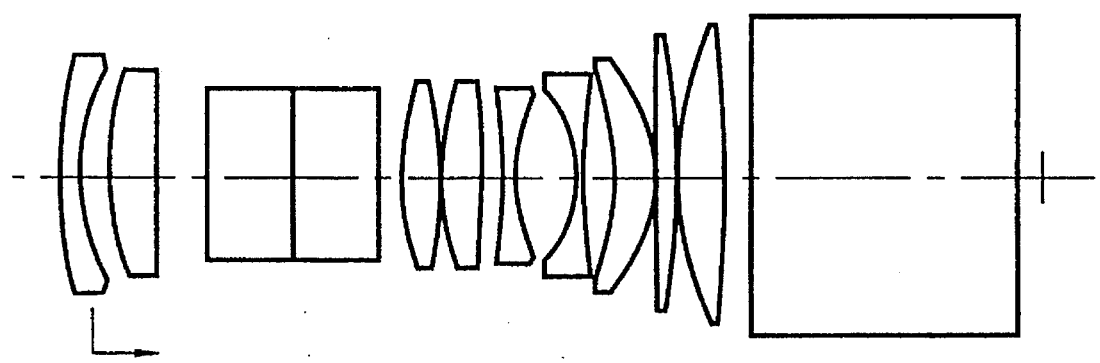
FIG. 8 is a cross-sectional view of the lens of a second numerical value embodiment of the present invention.
Figure 9:
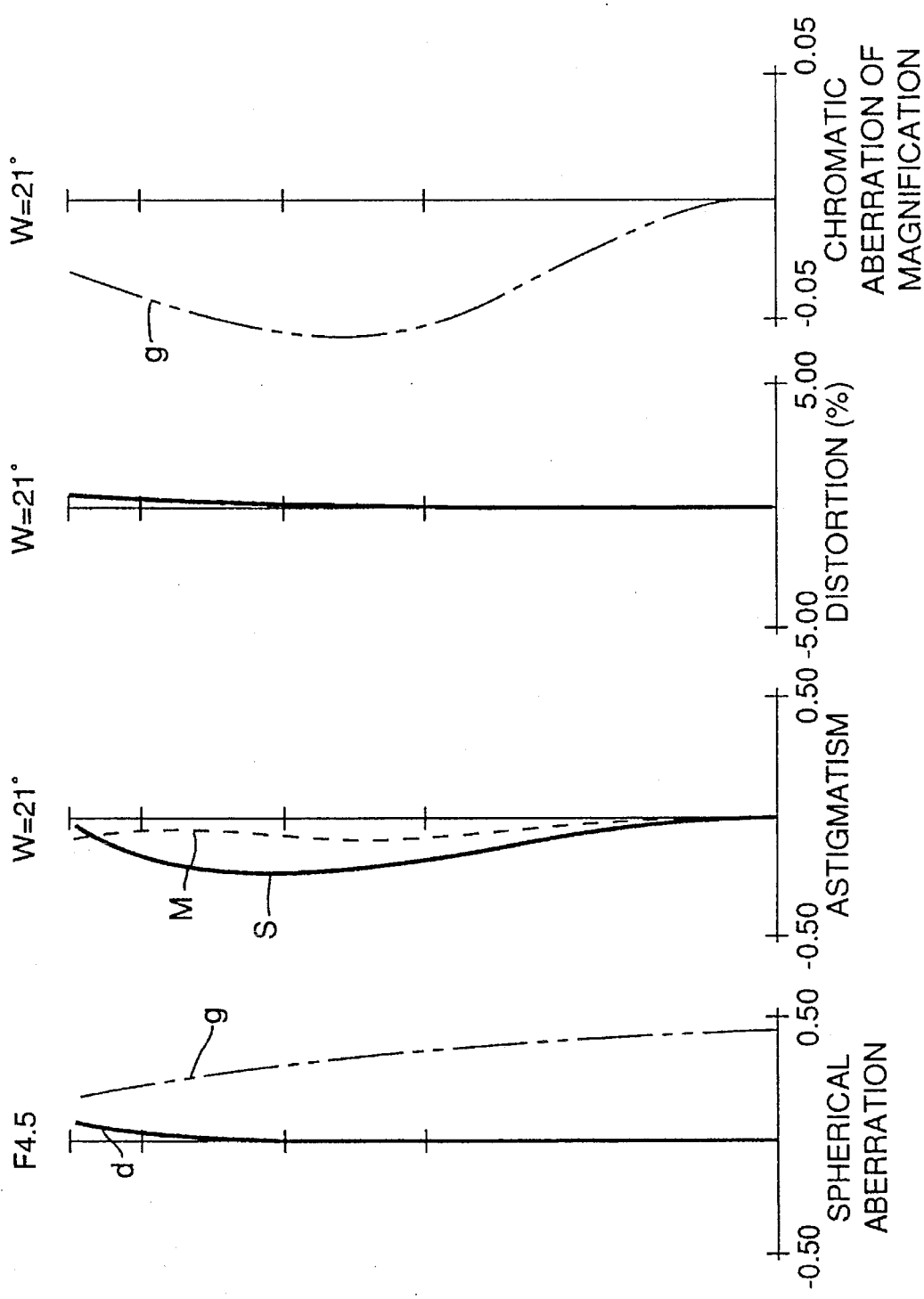
FIG. 9 shows aberrations in the second numerical value embodiment (magnification 40×).
Figure 10:
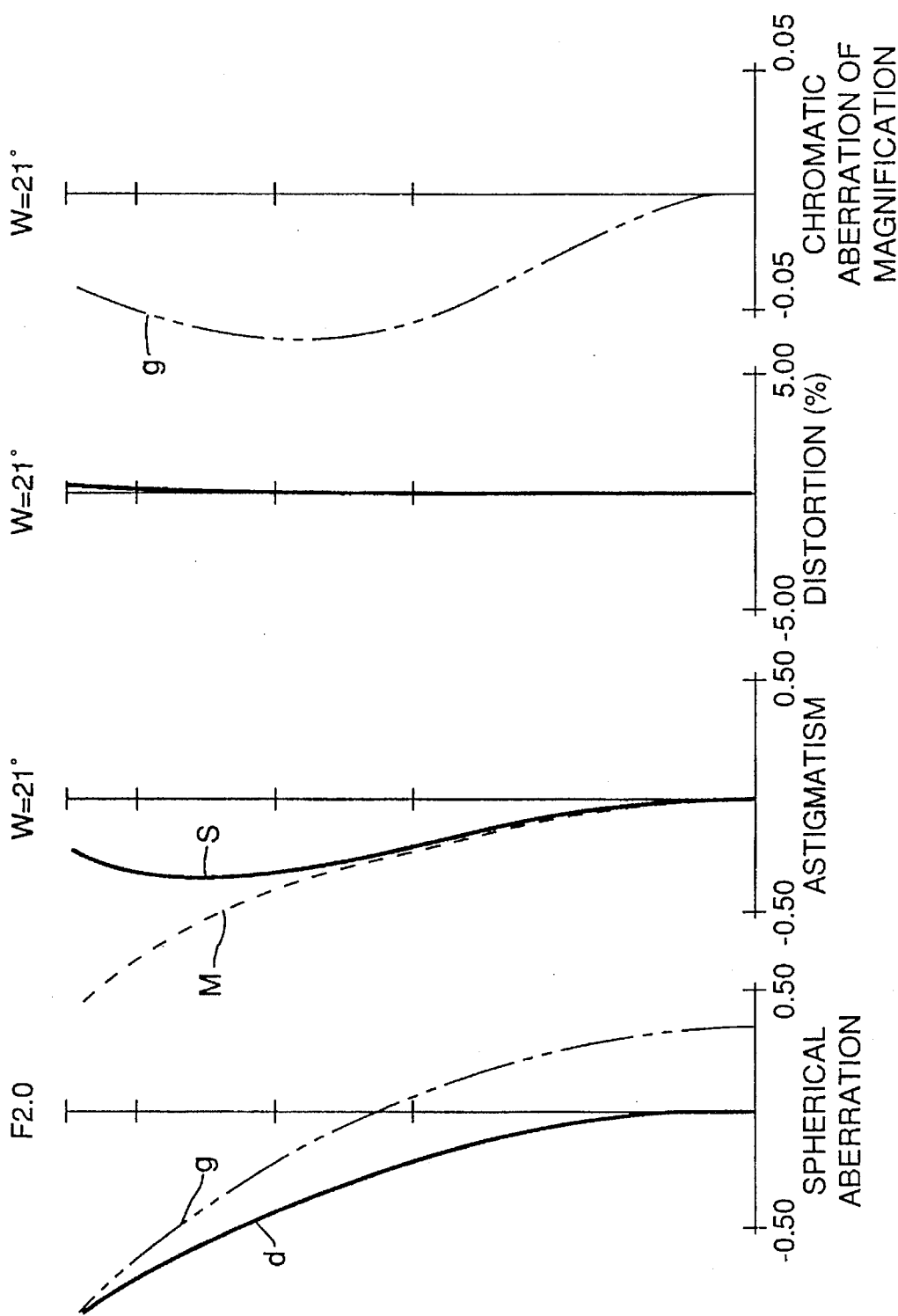
FIG. 10 shows aberrations in the second numerical value embodiment (magnification 20×).
Figure 11:
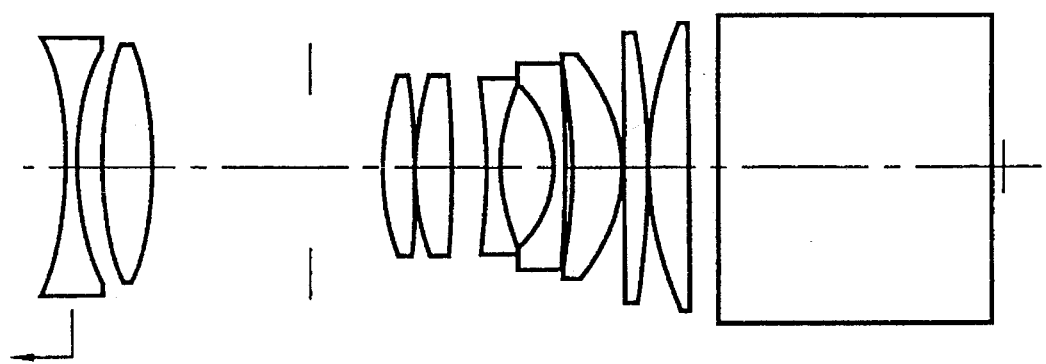
FIG. 11 is a cross-sectional view of the lens of a third numerical value embodiment of the present invention.
Figure 12:
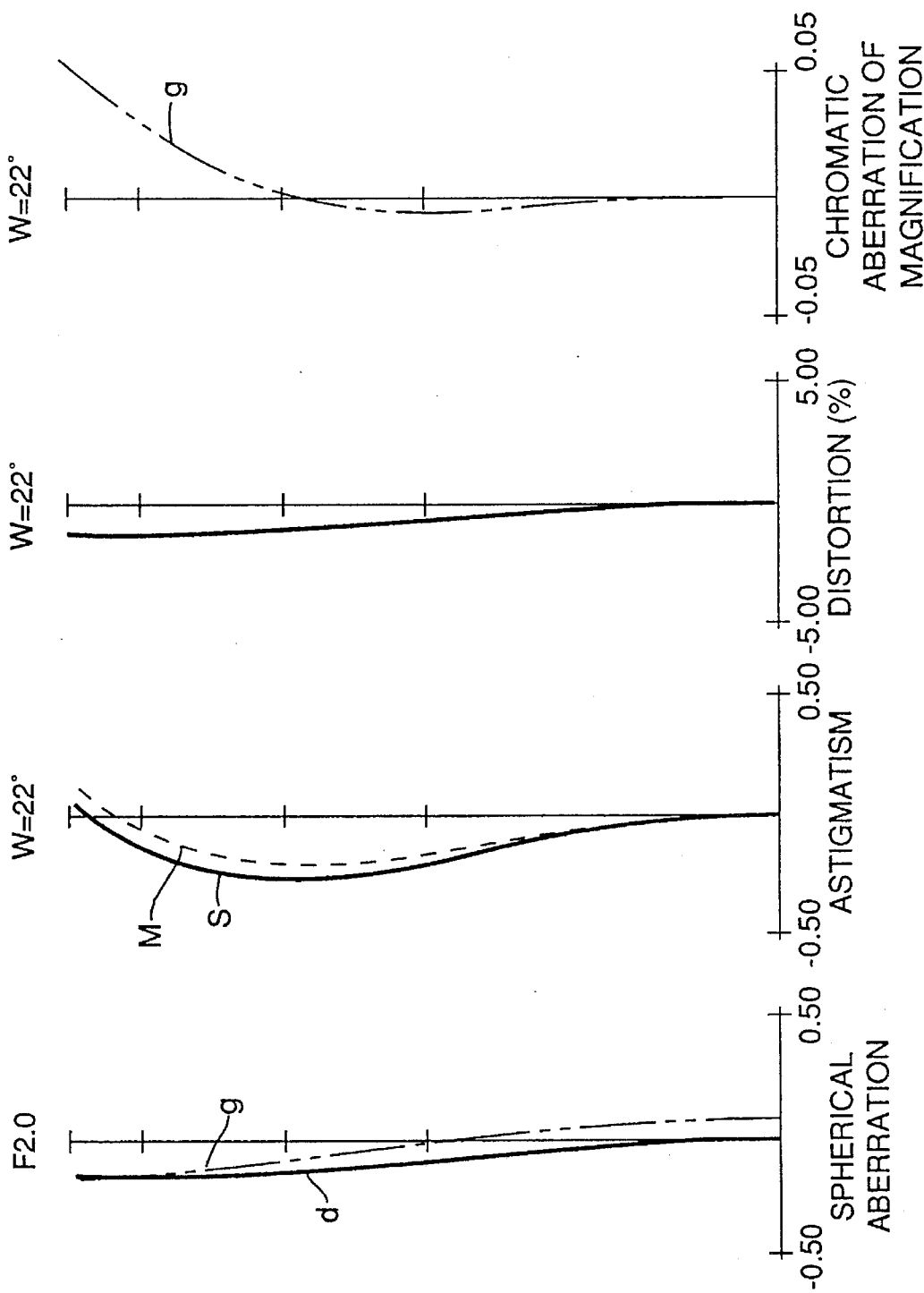
FIG. 12 shows aberrations in the third numerical value embodiment (magnification 40×).
Figure 13:
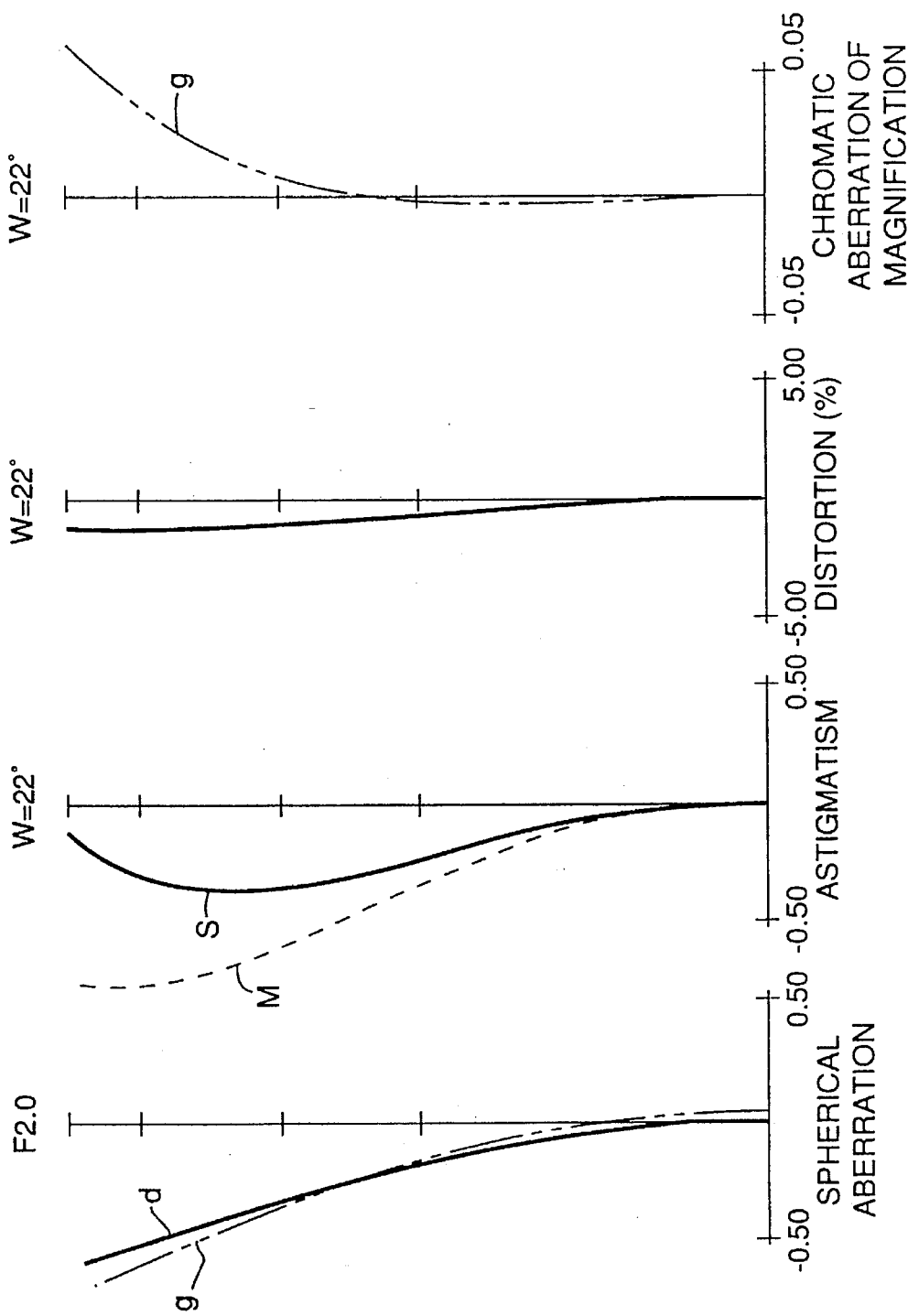
FIG. 13 shows aberrations in the third numerical value embodiment (magnification 20×).
Figure 14:
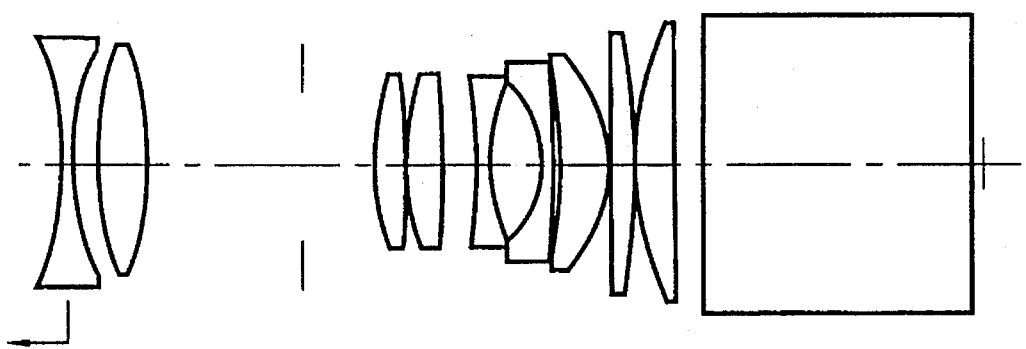
FIG. 14 is a cross-sectional view of the lens of a fourth numerical value embodiment of the present invention.
Figure 15:
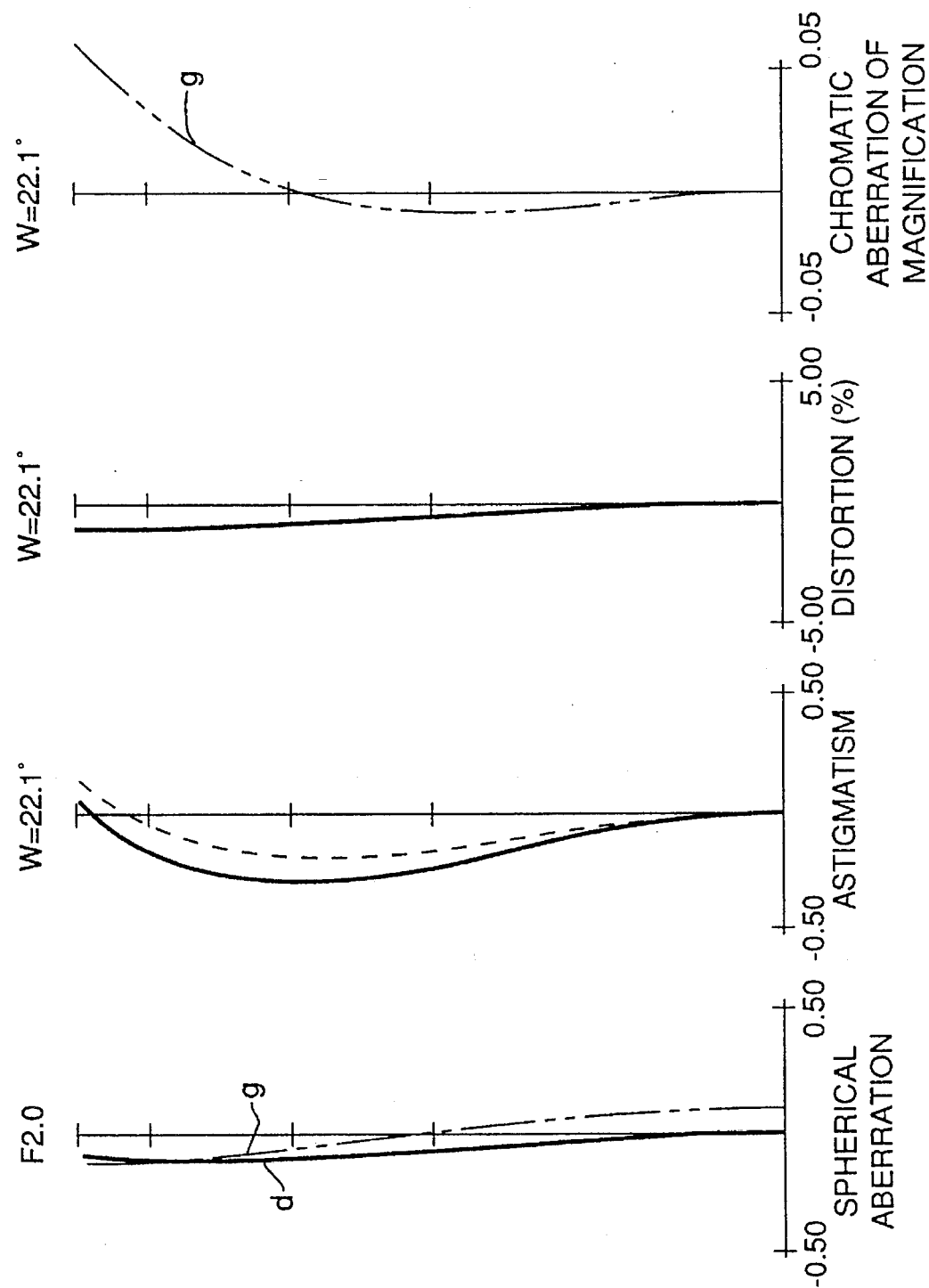
FIG. 15 shows aberrations in the fourth numerical value embodiment (magnification 40×).
Figure 16:
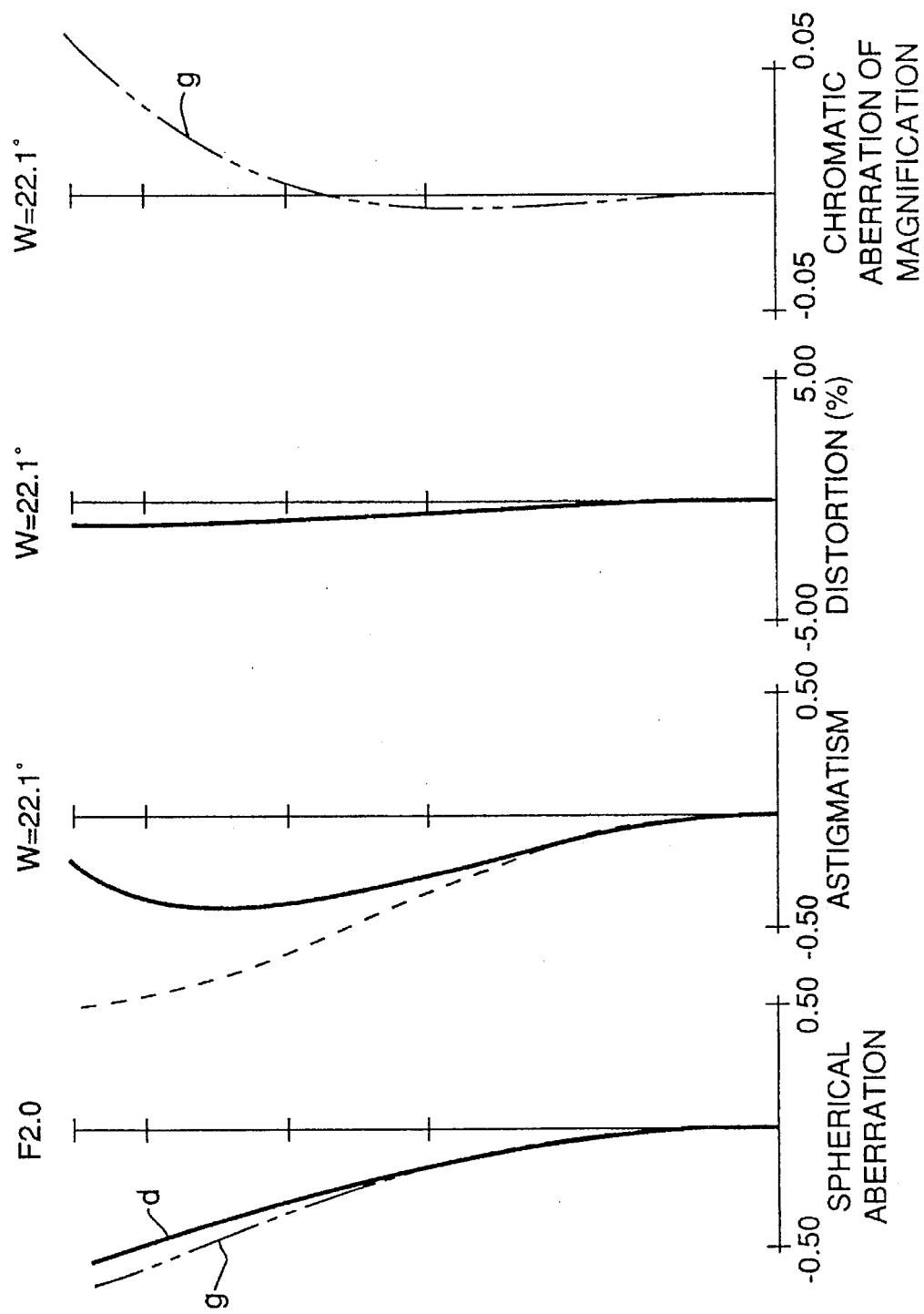
FIG. 16 shows aberrations in the fourth numerical value embodiment (magnification 20×).
Figure 17:
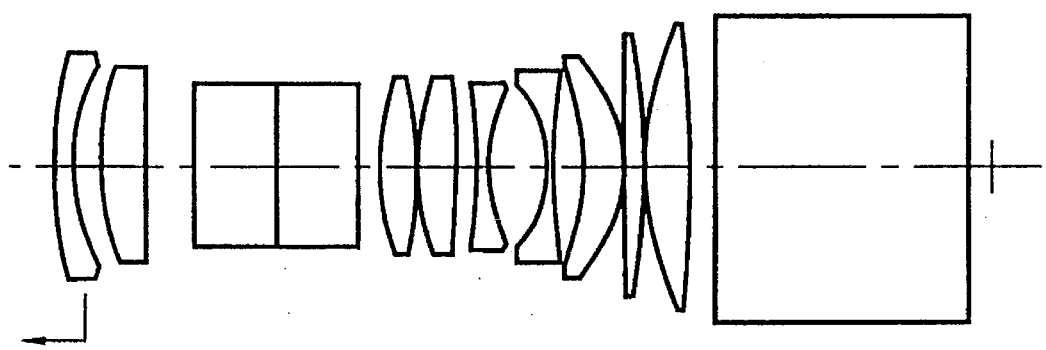
FIG. 17 is a cross-sectional view of the lens of a fifth numerical value embodiment of the present invention.
Figure 18:
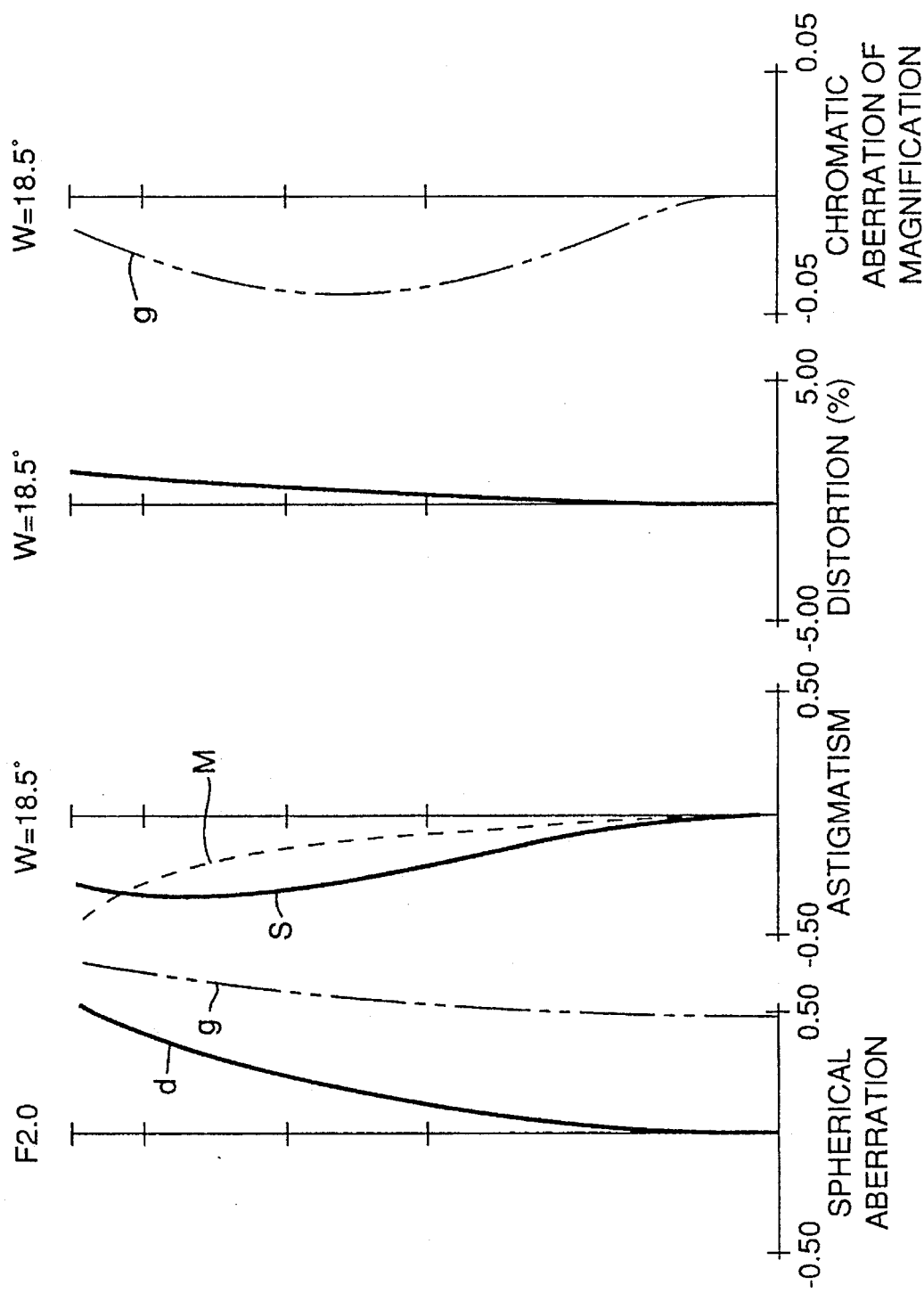
FIG. 18 shows aberrations in the fifth numerical value embodiment (magnification 40×).
Figure 19:
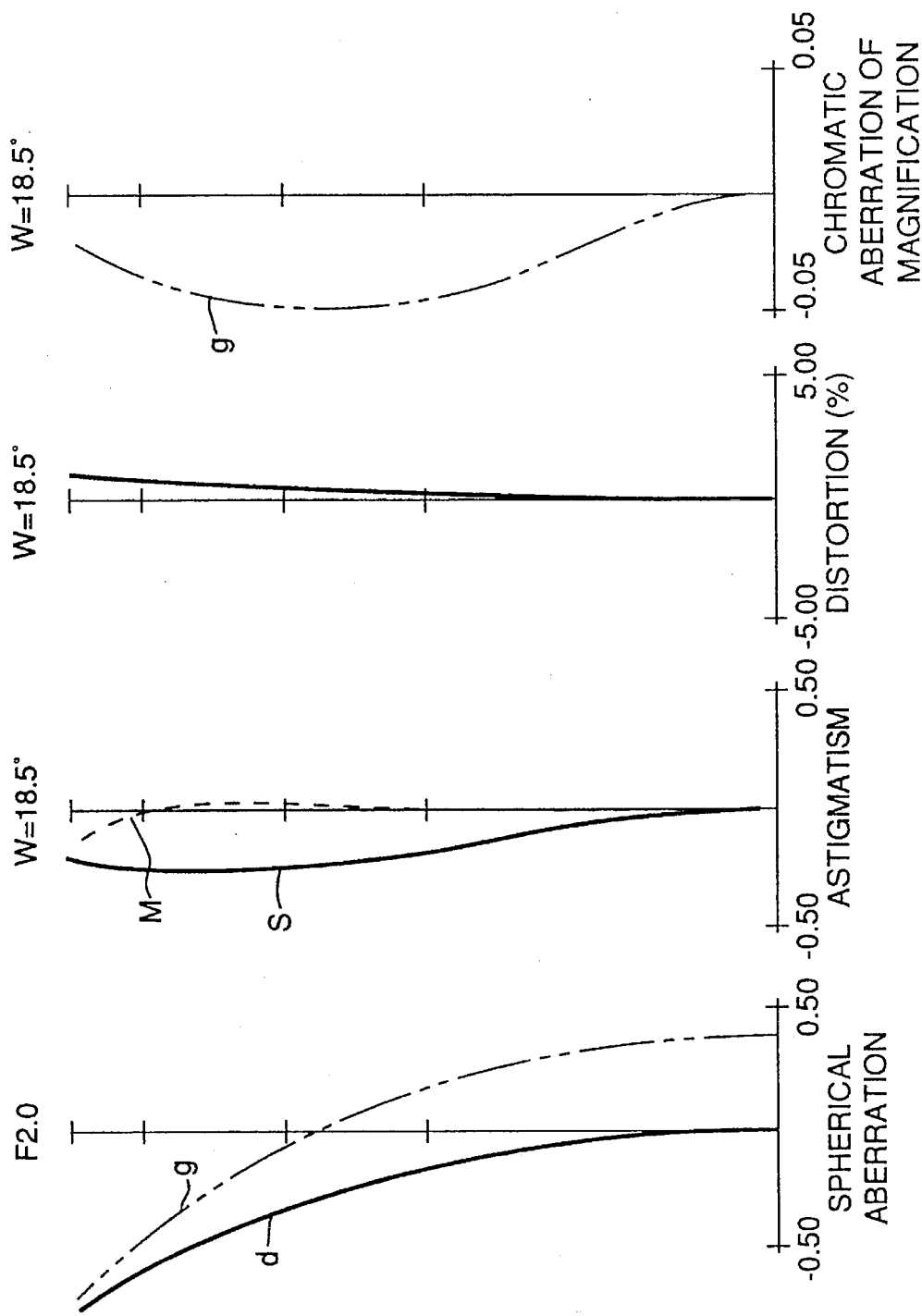
FIG. 19 shows aberrations in the fifth numerical value embodiment (magnification 20×).
Figure 20:
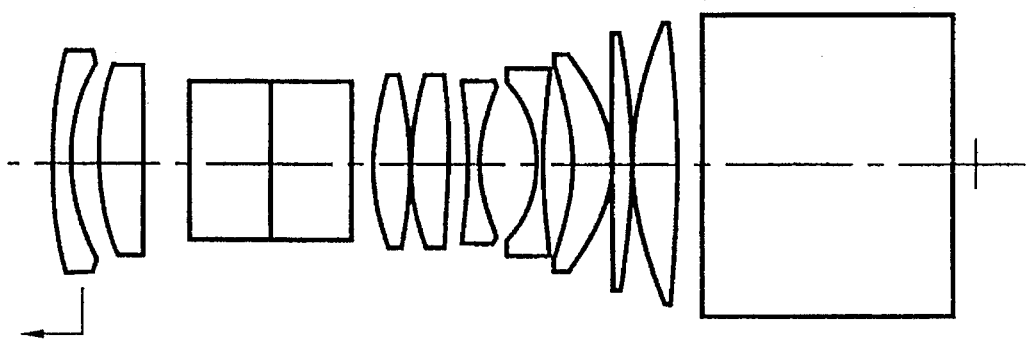
FIG. 20 is a cross-sectional view of the lens of a sixth numerical value embodiment of the present invention.
Figure 21:
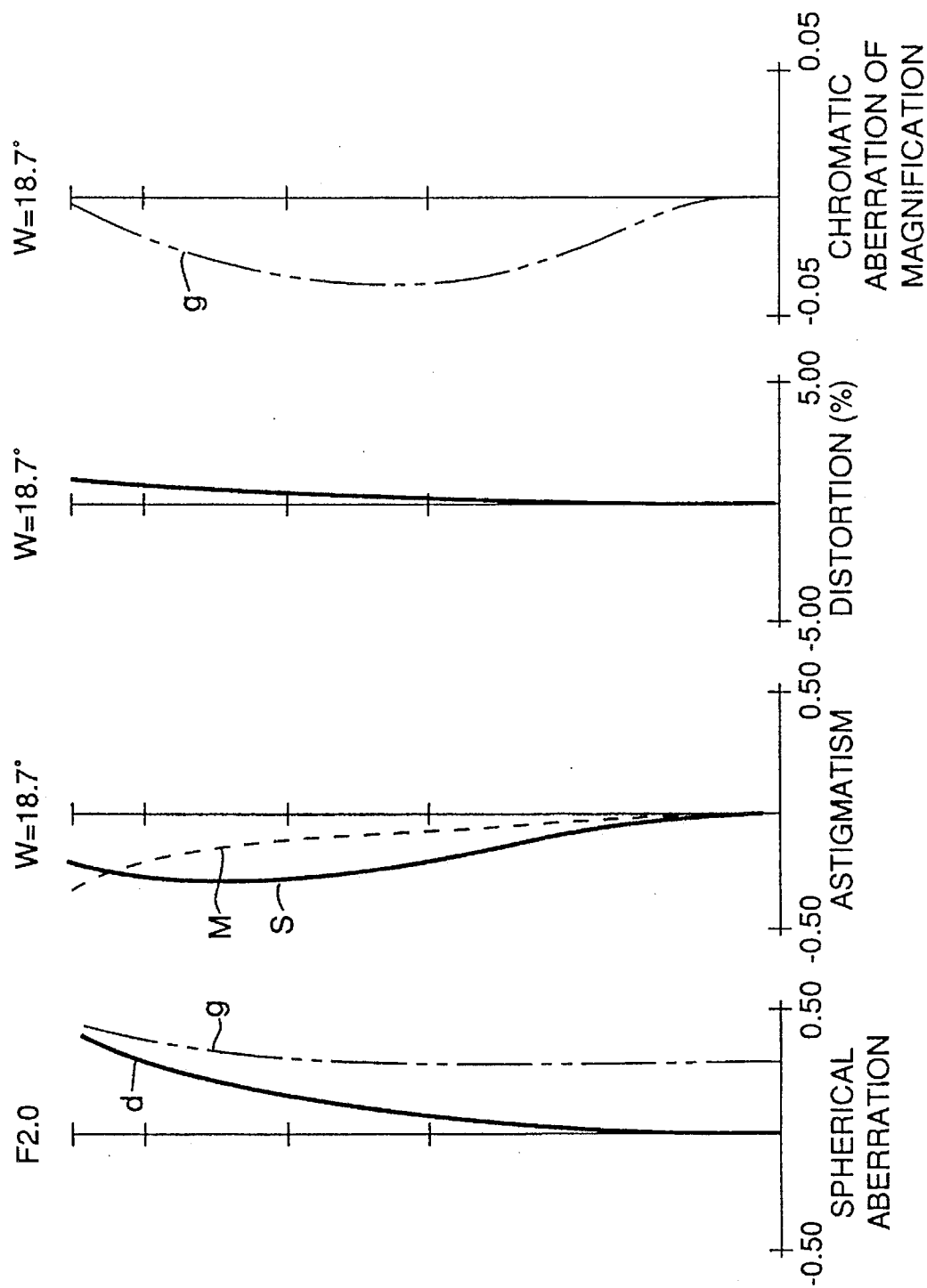
FIG. 21 shows aberrations in the sixth numerical value embodiment (magnification 40×).
Figure 22:
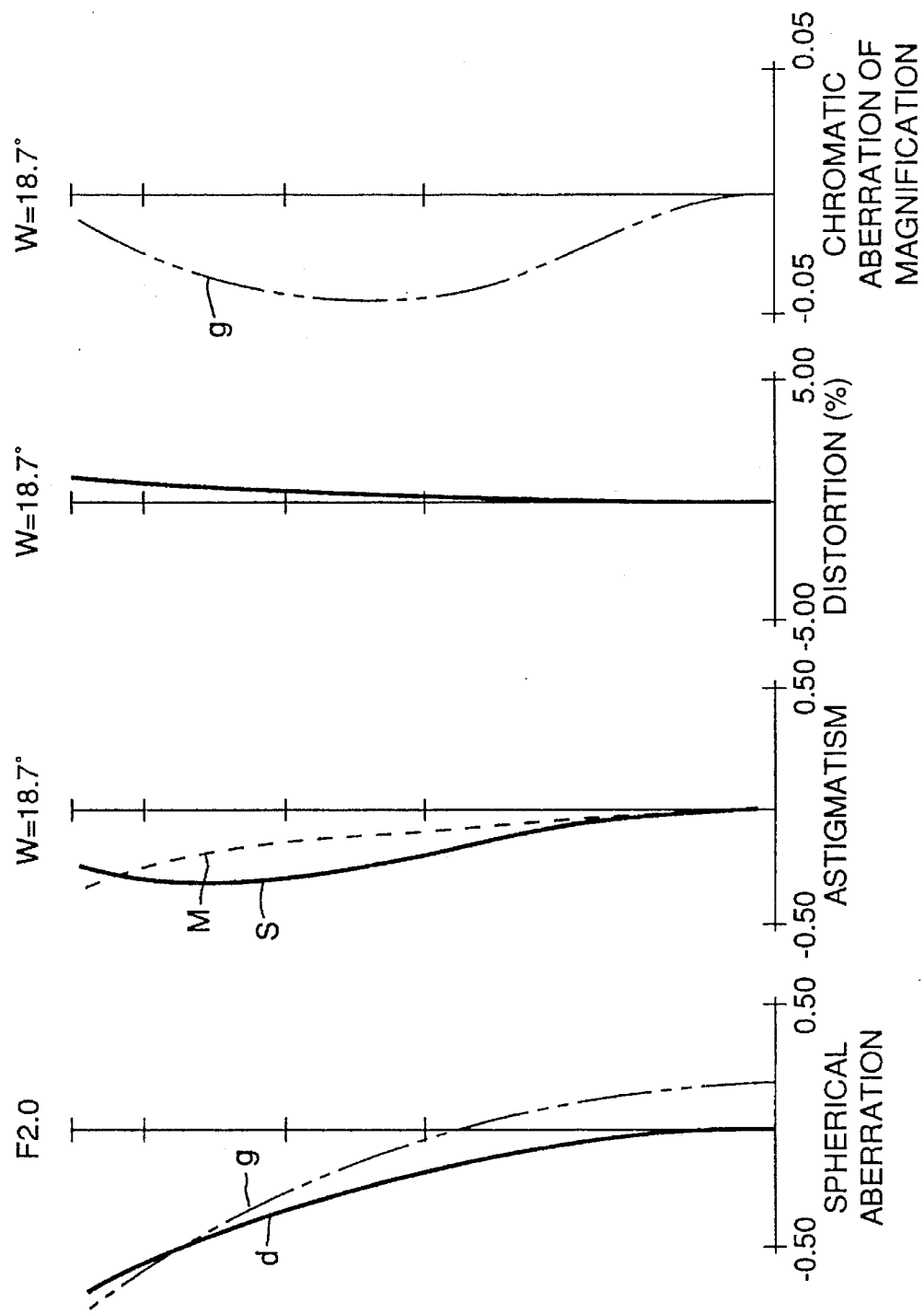
FIG. 22 shows aberrations in the sixth numerical value embodiment (magnification 20×).
Figure 23:
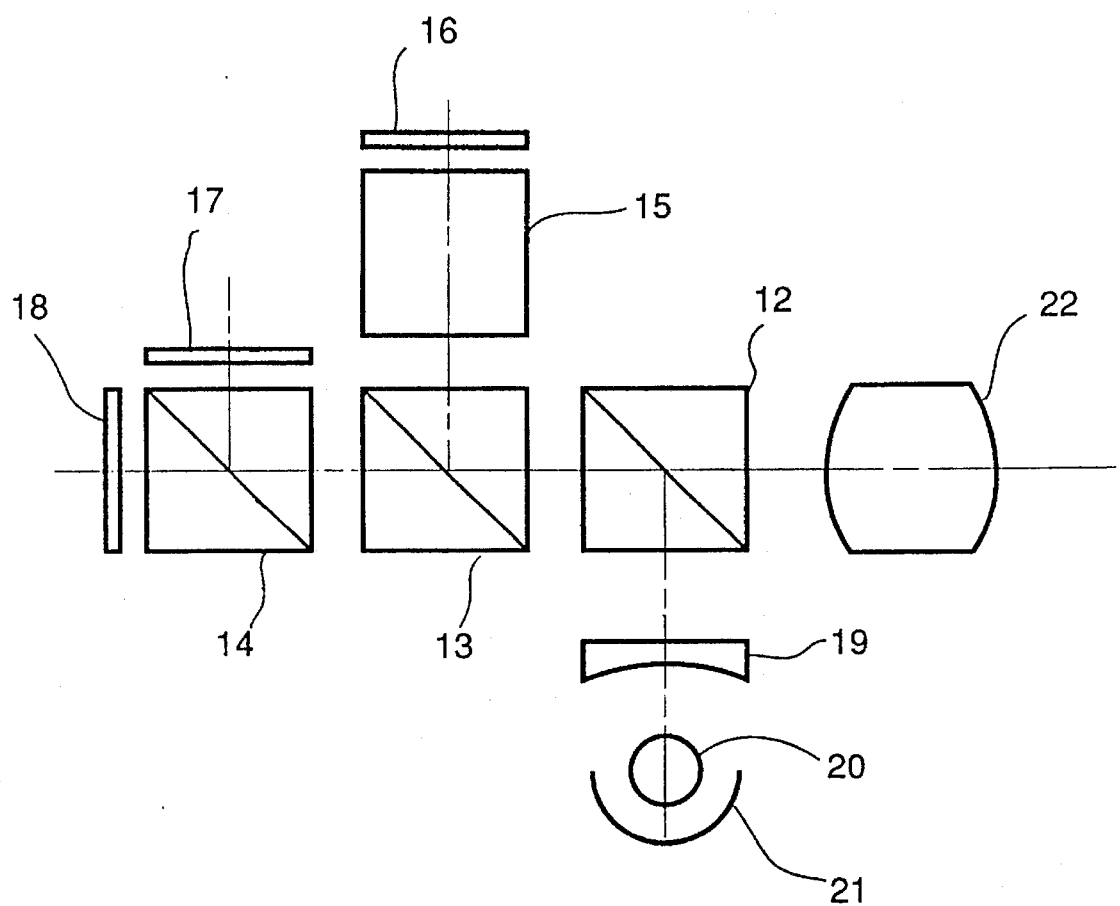
FIG. 23 is a cross-sectional view showing the essential portions of a projection optical system according to the prior art.

In FIG. 1, the reflecting surface 4a is constructed as a polarizing beam splitter, but alternatively, this reflecting surface may be replaced by a half mirror 10 as shown in FIG. 3, or by a dot mirror 11 having reflecting portions and transmitting portions disposed alternately as shown in FIG. 4.

Now, the projection lens according to the present invention is designed such that the light of the illuminating light source 9 illuminates each liquid crystal display device by way of the reflecting surface 4a and through the second lens unit, and the first lens unit is divided into a front sub-lens unit having negative refractive power and a rear sub-lens unit having positive refractive power, and the spacing between these sub-lens units is changed so as to effect focusing.

In the present invention, it is desirable that the following conditional expressions be satisfied to maintain the optical performance of the entire system well and to suppress aberration fluctuation when focusing is effected by the first lens unit. The arrow in FIG. 1 indicates the direction of movement of the focusing lens.

$$0.4 < |\phi_{1f}/\phi| < 1.5 \quad (1)$$

$$0.8 < v_{1f}/v_{1s} < 1.2 \quad (2)$$

where $\phi$ is the refractive power of the entire projection lens system, $\phi_{1f}$ and $v_{1f}$ are the mean values of the refractive power and Abbe number, respectively, of the sub-lens unit moved during the focusing of the first lens unit, and $v_{1s}$ is the mean value of the Abbe number of the fixed sub-lens unit of the first lens unit.

Conditional expression (1) shows the ratio of the power of the focusing lens of the first lens unit to the power of the entire system, and if the lower limit value of this conditional expression is exceeded, the power of the focusing lens of the first lens unit will become too weak and the amount of movement for focusing will increase to thereby increase the diameter of the front lens, and this is not preferable.

If the upper limit value of conditional expression (1) is exceeded, the power of the focusing lens of the first lens unit will strengthen and therefore, the fluctuations of aberrations, particularly spherical aberration and curvature of image field, for a variation in the distance of the screen will become great, and this is not preferable.

Conditional expression (2) limits the ratio of the mean value of the Abbe number of the focusing lens of the first lens unit to the mean value of the Abbe number of the fixed lens of the first lens unit, and outside the range of this conditional expression, the occurrence of the chromatic aberration of magnification is remarkable, and this is not preferable.

Now, in the projection optical system according to the present invention, the position of the pupil of the projection lens is brought close to the position of the reflecting surface 4a so that the eclipse or darkening of the illuminating light by the reflecting surface 4a does not occur on the screen S.

To enable the illuminating light to illuminate the screen well at this time, it is desirable that the following conditional expression be satisfied:

$$0.15 < d \cdot \phi_2 < 0.30 \quad (3)$$

where d is the length of the optical path as converted into air spacing from the point of intersection between the reflecting surface or the extension plane of the reflecting surface and the optical axis of the projection lens to the lens surface of the second lens unit which is adjacent to the screen side, and $\phi_2$ is the refractive power of the second lens unit.

If the lower limit value of this conditional expression (3) is exceeded, the illuminating light will be eclipsed, and this is not preferable. On the other hand, if the upper limit value of this conditional expression is exceeded, the lens diameter of the second lens unit will be increased, and this is not preferable.

Some numerical value embodiments of the optical system according to the present invention will be shown below. In the following numerical value embodiments, $R_i$ represents the radius of curvature of the ith lens surface from the object side, $D_i$ represents the thickness and air gap of the ith lens from the object side, and $N_i$ and $v_i$ represent the refractive index and Abbe number, respectively, of the glass of the ith lens from the object side.

| (Numerical Value Embodiment 1) $F = 71.6$ $FNO = 1:2.0$ $2W = 39°$ | | | |
|---|---|---|---|
| R1 = 128.592 | D1 = 3.00 | N1 = 1.60311 | v1 = 60.7 |
| R2 = 45.749 | D2 = 7.00 | | |
| R3 = 71.250 | D3 = 10.00 | N2 = 1.60311 | v2 = 64.1 |
| R4 = 6463.902 | D4 = 10.00 | | |
| R5 = ∞ | D5 = 18.00 | N3 = 1.51633 | v3 = 64.1 |
| R6 = (stop) | D6 = 18.00 | N4 = 1.51633 | v4 = 64.1 |
| R7 = ∞ | D7 = 5.00 | | |
| R8 = 73.630 | D8 = 8.25 | N5 = 1.77250 | v5 = 49.6 |
| R9 = −163.325 | D9 = 0.20 | | |
| R10 = 81.054 | D10 = 7.63 | N6 = 1.77250 | v6 = 49.6 |
| R11 = −634.459 | D11 = 4.31 | | |
| R12 = −169.412 | D12 = 2.00 | N7 = 1.80518 | v7 = 25.4 |
| R13 = 44.566 | D13 = 12.42 | | |
| R14 = −32.515 | D14 = 2.00 | N8 = 1.64769 | v8 = 33.8 |
| R15 = 311.588 | D15 = 6.28 | | |
| R16 = −69.886 | D16 = 8.31 | N9 = 1.77250 | v9 = 49.6 |
| R17 = −36.806 | D17 = 0.20 | | |
| R18 = −3524.918 | D18 = 4.21 | N10 = 1.77250 | v10 = 49.6 |
| R19 = −189.899 | D19 = 0.20 | | |
| R20 = 83.234 | D20 = 10.11 | N11 = 1.77250 | v11 = 49.6 |
| R21 = −306.672 | D21 = 4.99 | | |
| R22 = ∞ | D22 = 56.00 | N12 = 1.51633 | v12 = 64.1 |
| R23 = ∞ | | | |
| $|\phi_{1f}/\phi| = 0.60$ | | | |
| $v_{1f}/v_{1s} = 1$ | | | |
| $d \cdot \phi_2 = 0.226$ | | | |

| (Numerical Value Embodiment 2) $F = 66.2$ $FNO = 1:2.0$ $2W = 42°$ | | | |
|---|---|---|---|
| R1 = −3916.141 | D1 = 3.00 | N1 = 1.60311 | v1 = 60.7 |
| R2 = 45.381 | D2 = 7.00 | | |
| R3 = 69.227 | D3 = 10.00 | N2 = 1.60311 | v2 = 60.7 |
| R4 = −156.151 | D4 = 10.00 | | |
| R5 = ∞ | D5 = 18.00 | N3 = 1.51633 | v3 = 64.1 |
| R6 = (stop) | D6 = 18.00 | N4 = 1.51633 | v4 = 64.1 |
| R7 = ∞ | D7 = 5.00 | | |
| R8 = 70.983 | D8 = 8.25 | N5 = 1.77250 | v5 = 49.6 |
| R9 = −157.324 | D9 = 0.20 | | |
| R10 = 87.114 | D10 = 7.63 | N6 = 1.77250 | v6 = 49.6 |
| R11 = −584.667 | D11 = 4.02 | | |
| R12 = −156.887 | D12 = 2.00 | N7 = 1.80518 | v7 = 25.4 |
| R13 = 44.403 | D13 = 13.14 | | |

(Numerical Value Embodiment 2)
F = 66.2   FNO = 1:2.0   2W = 42°

| | | | |
|---|---|---|---|
| R14 = −32.439 | D14 = 2.00 | N8 = 1.64769 | v8 = 33.8 |
| R15 = 292.889 | D15 = 5.98 | | |
| R16 = −76.981 | D16 = 7.60 | N9 = 1.77250 | v9 = 49.6 |
| R17 = −36.391 | D17 = 0.20 | | |
| R18 = −2928.012 | D18 = 4.66 | N10 = 1.77250 | v10 = 49.6 |
| R19 = −192.366 | D19 = 0.20 | | |
| R20 = 83.260 | D20 = 10.08 | N11 = 1.77250 | v11 = 49.6 |
| R21 = −299.570 | D21 = 4.97 | | |
| R22 = ∞ | D22 = 56.00 | N12 = 1.51633 | v12 = 64.1 |
| R23 = ∞ | | | |

$|\phi_{1f}/\phi| = 0.82$
$v_{1f}/v_{1s} = 1$
$d \cdot \phi_2 = 0.229$ (Numerical Value Embodiment 3)
F = 62.7   FNO = 1:2.0   2W = 44°

| | | | |
|---|---|---|---|
| R1 = −101.066 | D1 = 3.00 | N1 = 1.60311 | v1 = 60.7 |
| R2 = 63.974 | D2 = 6.00 | | |
| R3 = 85.747 | D3 = 11.25 | N2 = 1.60311 | v2 = 60.7 |
| R4 = −85.748 | D4 = 35.00 | | |
| R5 = (stop) | D5 = 15.00 | | |
| R6 = 59.414 | D6 = 8.25 | N3 = 1.78590 | v3 = 44.2 |
| R7 = 1409.977 | D7 = 0.20 | | |
| R8 = 85.758 | D8 = 6.65 | N4 = 1.71299 | v4 = 53.8 |
| R9 = 2093.315 | D9 = 8.22 | | |
| R10 = −229.344 | D10 = 2.00 | N5 = 1.80518 | v5 = 25.4 |
| R11 = 42.141 | D11 = 12.31 | | |
| R12 = −27.829 | D12 = 2.00 | N6 = 1.69895 | v6 = 30.1 |
| R13 = −514.065 | D13 = 1.19 | | |
| R14 = −167.773 | D14 = 11.40 | N7 = 1.77250 | v7 = 49.6 |
| R15 = −38.480 | D15 = 0.20 | | |
| R16 = 5258.723 | D16 = 7.55 | N8 = 1.77250 | v8 = 49.6 |
| R17 = −89.605 | D17 = 0.20 | | |
| R18 = 92.583 | D18 = 7.90 | N9 = 1.77250 | v9 = 49.6 |
| R19 = ∞ | D19 = 5.10 | | |
| R20 = ∞ | D20 = 59.20 | N10 = 1.51633 | v10 = 64.1 |
| R21 = ∞ | | | |

$|\phi_{1f}/\phi| = 0.98$
$v_{1f}/v_{1s} = 1$
$d \cdot \phi_2 = 0.209$ (Numerical Value Embodiment 4)
F = 62.4   FNO = 1:2.0   2W = 44.2°

| | | | |
|---|---|---|---|
| R1 = −100.316 | D1 = 3.00 | N1 = 1.60311 | v1 = 60.7 |
| R2 = 64.196 | D2 = 6.00 | | |
| R3 = 85.747 | D3 = 11.51 | N2 = 1.60311 | v2 = 60.7 |
| R4 = −85.748 | D4 = 35.00 | | |
| R5 = (stop) | D5 = 15.00 | | |
| R6 = 56.769 | D6 = 6.40 | N3 = 1.77250 | v3 = 49.6 |
| R7 = −1514.170 | D7 = 0.20 | | |
| R8 = 84.532 | D8 = 3.52 | N4 = 1.78590 | v4 = 44.2 |
| R9 = 237.710 | D9 = 9.72 | | |
| R10 = −425.900 | D10 = 2.00 | N5 = 1.80518 | v5 = 25.4 |
| R11 = 42.141 | D11 = 12.69 | | |
| R12 = −27.635 | D12 = 2.00 | N6 = 1.64769 | v6 = 33.8 |
| R13 = −6885.777 | D13 = 1.75 | | |
| R14 = −171.971 | D14 = 11.85 | N7 = 1.69680 | v7 = 55.5 |
| R15 = −37.828 | D15 = 0.20 | | |
| R16 = 1389.573 | D16 = 8.38 | N8 = 1.69680 | v8 = 55.5 |
| R17 = −84.844 | D17 = 0.20 | | |
| R18 = 83.352 | D18 = 8.91 | N9 = 1.69680 | v9 = 55.5 |
| R19 = ∞ | D19 = 5.00 | | |
| R20 = ∞ | D20 = 59.20 | N10 = 1.51633 | v10 = 64.1 |
| R21 = ∞ | | | |

$|\phi_{1f}/\phi| = 0.97$
$v_{1f}/v_{1s} = 1$
$d \cdot \phi_2 = 0.210$ (Numerical Value Embodiment 5)
F = 76.01955   FNO = 1;   2W =

| | | | |
|---|---|---|---|
| R1 = 103.747 | D1 = 3.00 | N1 = 1.60621 | v1 = 60.7 |
| R2 = 47.374 | D2 = 7.00 | | |
| R3 = 64.533 | D3 = 10.00 | N2 = 1.51884 | v2 = 64.1 |
| R4 = 773.355 | D4 = 10.00 | | |
| R5 = ∞ | D5 = 18.00 | N3 = 1.51884 | v3 = 64.1 |
| R6 = (stop) | D6 = 18.00 | N4 = 1.51884 | v4 = 64.1 |
| R7 = ∞ | D7 = 5.00 | | |
| R8 = 68.275 | D8 = 8.25 | N5 = 1.77735 | v6 = 49.6 |
| R9 = −241.619 | D9 = 0.20 | | |
| R10 = 84.802 | D10 = 7.63 | N6 = 1.77735 | v6 = 49.6 |
| R11 = −776.696 | D11 = 4.98 | | |
| R12 = −147.871 | D12 = 2.00 | N7 = 1.81499 | v7 = 25.4 |
| R13 = 44.373 | D13 = 13.92 | | |
| R14 = −32.869 | D14 = 2.00 | N8 = 1.65364 | v8 = 33.8 |
| R15 = 629.200 | D15 = 4.98 | | |
| R16 = −70.218 | D16 = 8.63 | N9 = 1.77735 | v9 = 49.6 |
| R17 = −37.923 | D17 = 0.20 | | |
| R18 = −2273.108 | D18 = 4.73 | N10 = 1.77735 | v10 = 49.6 |
| R19 = −154.565 | D19 = 0.20 | | |
| R20 = 83.886 | D20 = 10.22 | N11 = 1.77735 | v11 = 49.6 |
| R21 = −304.247 | D21 = 4.98 | | |
| R22 = ∞ | D22 = 56.00 | N12 = 1.51884 | v12 = 64.1 |
| R23 = ∞ | | | |

$|\phi_{1f}/\phi| = 0.52$
$v_{1f}/v_{1s} = 0.95$
$d \cdot \phi_2 = 0.219$ (Numerical Value Embodiment 6)
F = 75.10962   FNO = 1:   2W =

| | | | |
|---|---|---|---|
| R1 = 233.984 | D1 = 3.00 | N1 = 1.51884 | v1 = 64.1 |
| R2 = 48.513 | D2 = 7.00 | | |
| R3 = 66.115 | D3 = 10.00 | N2 = 1.60621 | v2 = 60.7 |
| R4 = −1485.500 | D4 = 10.00 | | |
| R5 = ∞ | D5 = 18.00 | N3 = 1.51884 | v3 = 64.1 |
| R6 = (stop) | D6 = 18.00 | N4 = 1.51884 | v4 = 64.1 |
| R7 = ∞ | D7 = 5.00 | | |
| R8 = 72.835 | D8 = 8.25 | N5 = 1.77735 | v5 = 49.6 |
| R9 = −363.450 | D9 = 0.20 | | |
| R10 = 82.338 | D10 = 7.63 | N6 = 1.77735 | v6 = 49.6 |
| R11 = −790.300 | D11 = 4.86 | | |
| R12 = −202.748 | D12 = 2.00 | N7 = 1.81499 | v7 = 25.4 |
| R13 = 43.292 | D13 = 13.61 | | |
| R14 = −32.656 | D14 = 2.00 | N8 = 1.65364 | v8 = 33.8 |
| R15 = 1613.337 | D15 = 4.30 | | |
| R16 = −70.069 | D16 = 9.67 | N9 = 1.77735 | v9 = 49.6 |
| R17 = −38.001 | D17 = 0.20 | | |
| R18 = −694.527 | D18 = 4.65 | N10 = 1.77735 | v10 = 49.6 |
| R19 = −138.281 | D19 = 0.20 | | |
| R20 = 83.705 | D20 = 10.30 | N11 = 1.77735 | v11 = 49.6 |
| R21 = −307.197 | D21 = 5.00 | | |
| R22 = ∞ | D22 = 56.00 | N12 = 1.51884 | v12 = 64.1 |
| R23 = ∞ | | | |

$|\phi_{1f}/\phi| = 0.63$
$v_{1f}/v_{1s} = 1.056$
$d \cdot \phi_2 = 0.221$

As described above, the projection optical system according to the present invention is an optical system in which a reflecting member is provided between the positive first lens unit and the positive second lens unit to thereby cause illuminating light to enter, and that part of the first lens unit which is adjacent to the screen side is moved to thereby effect focusing, whereby there can be realized a very compact projection optical system. Also, the focusing lens unit is light in weight and this is advantageous for focusing. There is also an advantage in that the aberration fluctuation, by a variation in distance, is small.

I claim:
1. A projection device for projecting an original image formed by an image information forming means onto a screen, comprising:

projection lens means having, in succession from a screen side to an original image side, a first lens unit comprising, in succession from the screen side, a front sub-lens unit of negative refractive power and a rear sub-lens unit of positive refractive power and having a positive refractive power as a whole, and a second lens unit having a plurality of lenses and having positive refractive power as a whole, wherein one of the sub-lens units is moved to effect focusing, and wherein an air gap between the front sub-lens unit and the rear sub-lens unit is changed to thereby effect focusing;

a light source for emitting a light beam; and reflecting means disposed between the first lens unit and the second lens unit to reflect the light beam from said light source toward the second lens unit in order to illuminate the image information forming means.

2. A projection device according to claim 1, which satisfies the following conditions:

$$0.4<|\phi_{1f}/\phi|<1.5$$

$$0.8<v_{1f}/v_{1s}<1.2$$

where $\phi$ is the refractive power of the entire system of said projection lens means, $\phi_{1f}$ and $v_{1f}$ are the mean values of the refractive power and the Abbe number, respectively, of the sub-lens unit moved by the focusing of the first lens unit, and is is the mean value of the Abbe number of a sub-lens unit of the first lens unit that is other than the sub-lens unit that is moved to effect focusing.

3. A projection device according to claim 2, which satisfies following condition:

$$0.15<d\cdot\phi_2<0.30$$

where d is the length from the point of intersection between a reflecting surface of said reflecting means or a plane extending therefrom and the optical axis of said projection lens means to the lens surface of the second lens unit that is closest to the screen side, and $\phi_2$ is the refractive power of the second lens unit.

4. A projection apparatus for projecting information from an information forming means by way of a cross dichroic prism onto a screen side, said projection apparatus:

projection lens means having, in succession from the screen side to the cross dichroic prism, a first lens unit comprising a plurality of sub-lens units, and having a positive refractive power as a whole, and a second lens unit having a plurality of lenses and a positive refractive power as a whole, wherein one of the sub-lens units is moved to effect focusing;

a light source for emitting a light beam; and reflecting means disposed between the first lens unit and the second lens unit to reflect the light beam from said light source toward the second lens unit in order to illuminate the image information forming means.

5. A projection apparatus according to claim 4, wherein the first lens unit has, in succession from the screen side, a front sub-lens unit of negative refractive power and a rear sub-lens unit of positive refractive power, wherein an air gap between the front sub-lens unit and the rear sub-lens unit is changed to effect focusing.

6. A projection apparatus according to claim 5, which satisfies the following conditions:

$$0.4<|\phi_{1f}/\phi|<1.5$$

$$0.8<v_{1f}/v_{1s}<1.2$$

where $\phi$ is the refractive power of the entire system of said projection lens means, $\phi_{1f}$ and $v_{1f}$ are the mean values of the refractive power and the Abbe number, respectively, of the sub-lens unit moved by the focusing of the first lens unit, and $v_{1s}$ is the mean value of the Abbe number of a sub-lens unit of the first lens unit that is other than the sub-lens unit that is moved to effect focusing.

7. A projection apparatus according to claim 6, which satisfies the following conditions:

$$0.15<d\cdot\phi_2<0.30$$

wherein d is the length from the point of intersection between a reflecting surface of said reflecting means or a plane extending therefrom and the optical axis of the projection lens means to the lens surface of the second lens unit that is nearest to the screen side, and $\phi_2$ is the refractive power of the second lens unit.

8. A projection device for projecting an original image formed by an image information means onto a screen, comprising:

projection lens means having, in succession from a screen side to an original image side, a first lens unit comprising, a front sub-lens unit of negative refractive power and a rear sub-lens unit of positive refractive power and having a positive refractive power as a whole, and a second lens unit having a plurality of lenses and having positive refractive power as a whole, wherein an air gap between the front sub-lens unit and the rear sub-lens unit is changed to thereby effect focusing, said device satisfying the following conditions:

$$0.4<|\phi_{1f}/\phi|<1.5$$

$$0.8<v_{1f}/v_{1s}<1.2$$

where $\phi$ is the refractive power of the entire system of said projection lens means, $\phi_{1f}$ and $\phi_{1f}$ are the mean values of the refractive power and the Abbe number, respectively, of the sub-lens unit moved by the focusing of the first lens unit, and $v_{1s}$ is the mean value of the Abbe number of a sub-lens unit of the first lens unit that is other than the sub-lens unit that is moved to effect focusing, and wherein said front sub-lens unit and said rear sub-lens unit are disposed in order from said screen side.

9. A projection device according to claim 8, wherein said projection lens means has air gaps between lenses of said projection lens means and wherein a largest air gap of the air gaps resides between said first lens unit and said second lens unit.

* * * * *

UNITED STATES PATENT AND TRADEMARK OFFICE
CERTIFICATE OF CORRECTION

PATENT NO. : 5,552,938
DATED : September 3, 1996
INVENTOR(S) : SABURO SUGAWARA

It is certified that error appears in the above-indentified patent and that said Letters Patent is hereby corrected as shown below:

<u>Column 1,</u>
line 46, "optimal" should read --optical--.

<u>Column 2,</u>
line 8, "2033)." should read --20X).--.

<u>Column 6,</u>
line 4 "$v6=49.6$" should read --$v5=49.6$--.

<u>Column 7,</u>
line 31, "is is" should read
--$v_{1s}$ is--.

<u>Column 8,</u>
line 50, "and $\phi_{1f}$" should read --and $v_{1f}$--.

Signed and Sealed this

Eleventh Day of February, 1997

Attest:

BRUCE LEHMAN

Attesting Officer         Commissioner of Patents and Trademarks